(12) United States Patent
Costenaro et al.

(10) Patent No.: US 10,097,661 B2
(45) Date of Patent: *Oct. 9, 2018

(54) UPLOADING ATTACHMENT TO SHARED LOCATION AND REPLACING WITH A LINK

(71) Applicant: Microsoft Technology Licensing, LLC, Redmond, WA (US)

(72) Inventors: Daniel Paul Costenaro, Bellevue, WA (US); Jedidiah Brown, Seattle, WA (US); Joshua Adam Meisels, Seattle, WA (US); Marta Rey-Babarro, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 187 days.

This patent is subject to a terminal disclaimer.

(21) Appl. No.: 14/853,098

(22) Filed: Sep. 14, 2015

(65) Prior Publication Data

US 2016/0006832 A1  Jan. 7, 2016

Related U.S. Application Data

(63) Continuation of application No. 13/096,910, filed on Apr. 28, 2011, now Pat. No. 9,137,185.

(51) Int. Cl.
*G06F 15/16* (2006.01)
*H04L 29/08* (2006.01)
*H04L 12/58* (2006.01)

(52) U.S. Cl.
CPC .......... *H04L 67/2857* (2013.01); *H04L 51/08* (2013.01)

(58) Field of Classification Search
CPC ...................................................... H04L 51/08
See application file for complete search history.

(56) References Cited

U.S. PATENT DOCUMENTS

| 5,355,472 A | 10/1994 | Lewis |
| 5,787,480 A | 7/1998 | Scales et al. |
| 5,864,870 A | 1/1999 | Guck |
| 5,903,723 A | 5/1999 | Beck ............................ 709/200 |
| 6,219,818 B1 | 4/2001 | Freivald et al. .............. 714/799 |

(Continued)

FOREIGN PATENT DOCUMENTS

| CN | 1449525 A | 10/2003 |
| CN | 1749998 A | 3/2006 |

(Continued)

OTHER PUBLICATIONS

U.S. Appl. No. 14/887,086, entitled Shared Attachments, filed Oct. 19, 2015.

(Continued)

*Primary Examiner* — Douglas B Blair (57) ABSTRACT

The size of attachments to an electronic message are examined before the message is sent to determine if the attachments exceed a size threshold. When the size of the attachments exceed the threshold, one or more of the attachments are uploaded to a shared location that is accessible to the recipients of the message. A link replaces each attachment that was uploaded to the shared location. Permissions are automatically set at the shared location such that each of the recipients of the message are able to access the uploaded attachment.

17 Claims, 7 Drawing Sheets

(56) References Cited

U.S. PATENT DOCUMENTS

| | | | |
|---|---|---|---|
| 6,275,850 B1 | 8/2001 | Beyda | 709/206 |
| 6,314,425 B1 | 11/2001 | Serbinis et al. | |
| 6,397,261 B1 | 5/2002 | Erldridge et al. | |
| 6,405,225 B1 | 6/2002 | Apfel | |
| 6,493,758 B1 | 12/2002 | McLain | 709/227 |
| 6,533,822 B2 | 3/2003 | Kupiec | 715/253 |
| 6,687,741 B1 | 2/2004 | Ramaley et al. | 709/206 |
| 6,718,368 B1 | 4/2004 | Ayyadurai | |
| 6,763,496 B1 | 7/2004 | Hennings et al. | |
| 6,782,423 B1 | 8/2004 | Nakayama et al. | |
| 6,839,741 B1 | 1/2005 | Tsai | |
| 6,883,009 B2 | 4/2005 | Yoo | |
| 6,948,131 B1 | 9/2005 | Neven | |
| 6,954,934 B2 | 10/2005 | Kumar | |
| 6,978,276 B2 | 12/2005 | Demsky et al. | |
| 7,003,551 B2* | 2/2006 | Malik | H04L 51/08 709/206 |
| 7,028,075 B2 | 4/2006 | Morris | 709/206 |
| 7,054,905 B1 | 5/2006 | Hanna et al. | |
| 7,089,287 B2 | 8/2006 | Bellotti et al. | |
| 7,107,518 B2 | 9/2006 | Ramaley et al. | 715/235 |
| 7,113,948 B2* | 9/2006 | Jhingan | H04L 51/00 |
| 7,127,670 B2 | 10/2006 | Bendik | 715/200 |
| 7,130,885 B2 | 10/2006 | Chandra et al. | 709/206 |
| 7,143,091 B2 | 11/2006 | Charnock et al. | |
| 7,178,099 B2 | 2/2007 | Meyer et al. | 715/210 |
| 7,194,514 B1 | 3/2007 | Yen et al. | 709/206 |
| 7,290,034 B2 | 10/2007 | Budd et al. | 709/206 |
| 7,353,232 B1 | 4/2008 | Kalucha et al. | |
| 7,392,280 B2 | 6/2008 | Rohall et al. | 709/201 |
| 7,401,291 B2 | 7/2008 | Ramaley et al. | |
| 7,409,394 B2 | 8/2008 | Lee | |
| 7,409,424 B2 | 8/2008 | Parker | 709/206 |
| 7,424,543 B2 | 9/2008 | Rice, III | |
| 7,424,676 B1 | 9/2008 | Carlson et al. | |
| 7,444,382 B2* | 10/2008 | Malik | H04L 51/08 709/203 |
| 7,509,386 B2 | 3/2009 | Miyashita | |
| 7,536,440 B2 | 5/2009 | Budd et al. | 709/206 |
| 7,546,352 B1 | 6/2009 | Bhattiprolu et al. | |
| 7,565,409 B2 | 7/2009 | Heilbron et al. | |
| 7,580,982 B2 | 8/2009 | Owen et al. | |
| 7,593,943 B2 | 9/2009 | Clarke et al. | |
| 7,650,387 B2 | 1/2010 | Foo | 709/214 |
| 7,730,082 B2 | 6/2010 | Sah et al. | 707/770 |
| 7,752,269 B2 | 7/2010 | Chan et al. | |
| 7,783,711 B2 | 8/2010 | LeVasseur et al. | |
| 7,783,972 B2 | 8/2010 | Camps et al. | 715/255 |
| 7,814,425 B1 | 10/2010 | O'Shaugnessy | |
| 7,840,642 B2 | 11/2010 | Naick et al. | |
| 7,908,332 B2* | 3/2011 | Malik | H04L 51/08 709/206 |
| 7,917,591 B2* | 3/2011 | Vakkalanka | G06Q 10/107 709/204 |
| 7,970,850 B1 | 6/2011 | Callanan | |
| 8,108,464 B1 | 1/2012 | Rochelle et al. | |
| 8,140,975 B2 | 3/2012 | Lemay et al. | |
| 8,145,707 B2 | 3/2012 | Thayer et al. | |
| 8,176,123 B1 | 5/2012 | Wang et al. | |
| 8,185,591 B1 | 5/2012 | Lewis | |
| 8,196,029 B1 | 6/2012 | Rucker | |
| 8,458,269 B2* | 6/2013 | Friedman | G06Q 10/107 707/999.001 |
| 8,682,989 B2 | 3/2014 | Meisels et al. | |
| 8,965,983 B2 | 2/2015 | Costenaro et al. | |
| 9,137,185 B2* | 9/2015 | Costenaro | H04L 51/08 |
| 9,165,285 B2 | 10/2015 | Schultz et al. | |
| 2001/0051991 A1 | 12/2001 | Beyda et al. | |
| 2001/0054073 A1* | 12/2001 | Ruppert | G06Q 10/107 709/206 |
| 2002/0016818 A1 | 2/2002 | Kirani et al. | |
| 2002/0059384 A1 | 5/2002 | Kaars | |
| 2002/0062356 A1 | 5/2002 | Clarke et al. | |
| 2002/0065892 A1* | 5/2002 | Malik | G06Q 10/107 709/206 |
| 2002/0107931 A1 | 8/2002 | Singh et al. | |
| 2002/0129056 A1 | 9/2002 | Conant et al. | |
| 2002/0133633 A1 | 9/2002 | Kumar | |
| 2002/0138586 A1 | 9/2002 | Paleiov et al. | |
| 2002/0143691 A1 | 10/2002 | Ramaley et al. | |
| 2002/0174010 A1* | 11/2002 | Rice, III | G06F 17/30194 705/14.67 |
| 2003/0028528 A1 | 2/2003 | Christensen et al. | |
| 2003/0028600 A1 | 2/2003 | Parker | |
| 2003/0055907 A1 | 3/2003 | Stiers | 709/206 |
| 2003/0112273 A1 | 6/2003 | Hadfield et al. | |
| 2003/0131062 A1 | 7/2003 | Miyashita | |
| 2004/0034688 A1 | 2/2004 | Dunn | |
| 2004/0068545 A1 | 4/2004 | Daniell et al. | |
| 2004/0103044 A1 | 5/2004 | Vandewater et al. | 705/26.1 |
| 2004/0158607 A1 | 8/2004 | Coppinger et al. | 709/206 |
| 2004/0186894 A1 | 9/2004 | Jhingan et al. | 709/207 |
| 2004/0243672 A1 | 12/2004 | Markki et al. | |
| 2004/0261082 A1 | 12/2004 | Steere et al. | |
| 2005/0010799 A1 | 1/2005 | Kelley et al. | |
| 2005/0033813 A1 | 2/2005 | Bhogal et al. | |
| 2005/0044492 A1 | 2/2005 | Ramaley et al. | |
| 2005/0060382 A1 | 3/2005 | Spector | 709/213 |
| 2005/0091289 A1 | 4/2005 | Shappell et al. | |
| 2005/0114672 A1 | 5/2005 | Duncan et al. | |
| 2005/0122345 A1 | 6/2005 | Kirn et al. | |
| 2005/0166154 A1 | 7/2005 | Wilson | 715/751 |
| 2005/0188026 A1 | 8/2005 | Hilbert et al. | 709/206 |
| 2005/0251443 A1 | 11/2005 | Chan | 705/14.721 |
| 2005/0289221 A1 | 12/2005 | Steele | |
| 2006/0004819 A1 | 1/2006 | Claudatos et al. | |
| 2006/0020673 A1 | 1/2006 | Sorge et al. | |
| 2006/0031309 A1 | 2/2006 | Luoffo et al. | 709/206 |
| 2006/0075046 A1 | 4/2006 | Yozell-Epstein et al. | |
| 2006/0095527 A1* | 5/2006 | Malik | H04L 51/08 709/206 |
| 2006/0161516 A1 | 7/2006 | Clarke et al. | |
| 2006/0195526 A1 | 8/2006 | Lederer | 709/206 |
| 2006/0206570 A1 | 9/2006 | Heidloff et al. | 709/206 |
| 2006/0224679 A1 | 10/2006 | Kikuchi et al. | |
| 2006/0242208 A1 | 10/2006 | Goldick | |
| 2006/0259524 A1 | 11/2006 | Horton | |
| 2006/0282762 A1 | 12/2006 | Diamond et al. | 715/235 |
| 2006/0294455 A1 | 12/2006 | Morris et al. | |
| 2007/0005717 A1 | 1/2007 | LeVasseur et al. | |
| 2007/0022166 A1 | 1/2007 | Bhogal et al. | 709/206 |
| 2007/0118598 A1 | 5/2007 | Bedi et al. | |
| 2007/0118794 A1 | 5/2007 | Hollander et al. | |
| 2007/0130259 A1 | 6/2007 | Daniell et al. | |
| 2007/0136814 A1 | 6/2007 | Lee et al. | |
| 2007/0143419 A1 | 6/2007 | Plas | 709/206 |
| 2007/0143425 A1 | 6/2007 | Kieselbach et al. | 709/206 |
| 2007/0168459 A1 | 7/2007 | Fujita et al. | |
| 2007/0192490 A1 | 8/2007 | Minhas | |
| 2007/0198913 A1 | 8/2007 | Terao et al. | |
| 2007/0208782 A1 | 9/2007 | Carter et al. | |
| 2007/0233794 A1 | 10/2007 | Singh | |
| 2007/0271344 A1* | 11/2007 | Danasekaran | G06Q 10/10 709/206 |
| 2007/0271502 A1 | 11/2007 | Bedi et al. | |
| 2007/0283267 A1 | 12/2007 | Jeffery et al. | |
| 2008/0005139 A1 | 1/2008 | Hysom et al. | |
| 2008/0028017 A1 | 1/2008 | Garbow et al. | |
| 2008/0059539 A1 | 3/2008 | Chin et al. | |
| 2008/0120382 A1 | 5/2008 | Heidloff et al. | |
| 2008/0244721 A1 | 10/2008 | Barrus | |
| 2008/0250474 A1 | 10/2008 | Bhogal et al. | |
| 2008/0256458 A1 | 10/2008 | Aldred et al. | |
| 2008/0281924 A1 | 11/2008 | Gadwale | 709/206 |
| 2008/0282159 A1 | 11/2008 | Vanderwende et al. | 715/700 |
| 2008/0288862 A1 | 11/2008 | Smetters et al. | |
| 2009/0006948 A1 | 1/2009 | Parker et al. | |
| 2009/0024931 A1 | 1/2009 | Bae | |
| 2009/0030919 A1 | 1/2009 | Brezina et al. | |
| 2009/0030997 A1* | 1/2009 | Malik | H04L 51/08 709/206 |
| 2009/0031245 A1 | 1/2009 | Brezina et al. | |

(56) References Cited

U.S. PATENT DOCUMENTS

| | | |
|---|---|---|
| 2009/0063520 A1 | 3/2009 | Kimura |
| 2009/0094514 A1 | 4/2009 | Dargahl et al. |
| 2009/0100109 A1 | 4/2009 | Turski et al. |
| 2009/0157831 A1 | 6/2009 | Tian et al. ............... 709/206 |
| 2009/0187852 A1 | 7/2009 | Tsurata |
| 2009/0210721 A1* | 8/2009 | Phillips ............... G06F 21/6218 713/182 |
| 2009/0248808 A1 | 10/2009 | Izumi ..................... 709/206 |
| 2009/0313256 A1 | 12/2009 | Konduri et al. |
| 2009/0319618 A1 | 12/2009 | Affronti et al. ............ 709/206 |
| 2010/0011032 A1 | 1/2010 | Fukuoka |
| 2010/0017701 A1 | 1/2010 | Bargeron et al. ........... 715/230 |
| 2010/0023492 A1 | 1/2010 | Lucas |
| 2010/0057765 A1 | 3/2010 | Dispensa et al. ............ 707/102 |
| 2010/0057864 A1 | 3/2010 | Laird-McConnell |
| 2010/0057872 A1 | 3/2010 | Koons et al. |
| 2010/0070448 A1 | 3/2010 | Omoigui |
| 2010/0070588 A1 | 3/2010 | Sinn et al. |
| 2010/0076989 A1 | 3/2010 | Jakobson |
| 2010/0082713 A1 | 4/2010 | Frid-nielsen ............... 707/821 |
| 2010/0095198 A1 | 4/2010 | Bultrowicz et al. .......... 715/234 |
| 2010/0100566 A1* | 4/2010 | Hronopoulos ......... G06Q 10/00 707/784 |
| 2010/0106551 A1 | 4/2010 | Koskimies et al. |
| 2010/0125640 A1 | 5/2010 | Boddington et al. |
| 2010/0169295 A1 | 7/2010 | Kanamori |
| 2010/0169439 A1 | 7/2010 | O'Sullivan et al. |
| 2010/0169440 A1 | 7/2010 | O'Sullivan ............... 709/206 |
| 2010/0191774 A1 | 7/2010 | Mason et al. |
| 2010/0198927 A1 | 8/2010 | Tonnison et al. ............ 709/206 |
| 2010/0228611 A1 | 9/2010 | Shenfield |
| 2010/0228989 A1 | 9/2010 | Neystadt ................. 713/185 |
| 2010/0235763 A1 | 9/2010 | Massand |
| 2010/0273456 A1 | 10/2010 | Wolovitz et al. |
| 2010/0281224 A1 | 11/2010 | Ho et al. |
| 2010/0306180 A1 | 12/2010 | Johnson et al. |
| 2010/0306330 A1* | 12/2010 | Friedman ............ G06Q 10/107 709/206 |
| 2011/0055177 A1 | 3/2011 | Chakra et al. |
| 2011/0065419 A1* | 3/2011 | Book ................... G06F 21/305 455/411 |
| 2011/0066955 A1 | 3/2011 | Olson et al. |
| 2011/0113104 A1 | 5/2011 | Bhogal et al. |
| 2011/0119593 A1 | 5/2011 | Jacobson et al. |
| 2011/0145363 A1 | 6/2011 | Ananthanarayanan ....... 709/218 |
| 2011/0161435 A1 | 6/2011 | Mancuso |
| 2011/0276897 A1 | 11/2011 | Crevier et al. |
| 2011/0295959 A1 | 12/2011 | Martin et al. |
| 2012/0095890 A1 | 4/2012 | Santarlas |
| 2012/0117159 A1 | 5/2012 | Chakra et al. |
| 2012/0151379 A1 | 6/2012 | Schultz et al. |
| 2012/0192064 A1 | 7/2012 | Antebi et al. |
| 2012/0278281 A1 | 11/2012 | Meisels et al. |
| 2012/0278401 A1 | 11/2012 | Meisels et al. |
| 2012/0278402 A1 | 11/2012 | Limont et al. |
| 2012/0278403 A1 | 11/2012 | Costenaro et al. |
| 2012/0278404 A1 | 11/2012 | Meisels et al. |
| 2012/0278405 A1 | 11/2012 | Costenaro et al. |
| 2012/0278407 A1 | 11/2012 | Meisels et al. |
| 2012/0284344 A1 | 11/2012 | Costenaro et al. |
| 2012/0284345 A1 | 11/2012 | Costenaro et al. |
| 2014/0173423 A1 | 6/2014 | Meisels et al. |
| 2016/0043976 A1 | 2/2016 | Schultz et al. |

FOREIGN PATENT DOCUMENTS

| | | |
|---|---|---|
| CN | 1753400 A | 3/2006 |
| CN | 1795654 | 6/2006 |
| CN | 1831827 A | 9/2006 |
| CN | 1971553 A | 5/2007 |
| CN | 101009667 A | 8/2007 |
| CN | 101079846 A | 11/2007 |
| CN | 101655845 A | 2/2010 |
| CN | 101655870 | 2/2010 |
| EP | 933712 A2 | 8/1999 |
| JP | H05135056 A | 6/1993 |
| JP | 08235231 A | 9/1996 |
| JP | 10269236 A | 10/1998 |
| JP | 11161584 A | 6/1999 |
| JP | 11345182 A | 12/1999 |
| JP | 2001043151 A | 2/2001 |
| JP | 2001307006 A | 11/2001 |
| JP | 2002049615 | 2/2002 |
| JP | 2002091813 A | 3/2002 |
| JP | 2005011354 A | 1/2005 |
| JP | 2005025620 A | 1/2005 |
| JP | 2005084945 | 3/2005 |
| JP | 2005129061 A | 5/2005 |
| JP | 2007501969 | 2/2007 |
| JP | 2007213511 A | 8/2007 |
| JP | 2008-500646 | 1/2008 |
| RU | 2373653 | 3/2005 |
| WO | 2003052622 | 6/2003 |
| WO | 2005027404 | 3/2005 |
| WO | WO 2007/133504 | 11/2007 |
| WO | WO 2009/023769 A1 | 2/2009 |
| WO | 2009158108 A2 | 12/2009 |
| WO | 2010041505 A1 | 4/2010 |
| WO | 2010104659 A2 | 9/2010 |

OTHER PUBLICATIONS

Vogel et al., "Consistency Control for Synchronous and Asynchronous Collaboration Based on Shared Objects and Activities"; Computer Supported Copperative Work (CSCW); Kluwer Academic Publishers, vol. 13, No. 5-6; Dec. 1, 2004; pp. 573-602.

EP Communication dated Apr. 23, 2015 in Appln No. PCT/US2012/035710, 8 pgs.

Chinese Office Action and Search Report Issued in Chinese Patent Application No. 201280020368.3, dated Dec. 2, 2015, 14 pgs.

Chinese Office Action and Search Report Issued in Patent Application No. 201280021905.6, dated Dec. 2, 2015, 14 pgs.

Office Action dated Jan. 2, 2013, issued in U.S. Appl. No. 13/102,875.

Office Action dated Sep. 21, 2015, issued in U.S. Appl. No. 13/102,875, 53 pgs.

Office Action dated Nov. 23, 2015, issued in U.S. Appl. No. 13/096,936, 21 pgs.

Office Action dated Jan. 5, 2016, issued in U.S. Appl. No. 13/096,899, 19 pgs.

Australian Office Action Full Examination Report Issued in Patent Application No. 2012253808, dated Jul. 9, 2016, 3 Pages.

Chinese Office Action Issued in Patent Application No. 201280021905.6, dated Jul. 1, 2016, With English translation. 10 pgs.

Japanese Notice of Allowance Issued in Patent Application No. 2014-508169, dated Jul. 12, 2016, 3 Pages. Without English Translation.

Japanese Office Action Issued in Patent Application No. 2014-510385, dated May 30, 2016, With english translation. 9 Pages.

Russian Office Action Issued in Patent Application No. 2013149178, dated May 20, 2016, With English Translation. 9 Pages.

Chinese Office Action Issued in Patent Application No. 201280020342.9, dated Aug. 1, 2016, With English translation. 10 pages.

Chinese Second Office Action and Search Report Issued in Chinese Patent Application No. 201280020368.3, dated Aug. 5, 2016, 10 pages. With English Translation.

Chinese Second Office Action dated Aug. 29, 2016 in Application No. 201280021954.x, 5 pages.

Chinese Second Office Action Issued in Chinese Patent Application No. 201280020441.7, dated Aug. 1, 2016, 14 Pages. With English Translation.

European Office Action Issued in Application No. 12782951.3, dated Aug. 17, 2016, 6 pages.

Japanese Notice of Allowance Issued in Patent Application No. 2014-508170, dated Sep. 13, 2016, 3 Pages.

Japanese Notice of Allowance Issued in Patent Application No. 2014-508171, dated Aug. 4, 2016, 4 Pages.

Taiwan Office Action and Search Report Issued in Taiwan Patent Application No. 101110617, dated Jul. 26, 2016, 7 Pages.

(56) References Cited

OTHER PUBLICATIONS

U.S. Appl. No. 13/096,899, Office Action dated Sep. 26, 2016, 36 pages.
Office Action Issued in Chinese Patent Application No. 201280020342.9, dated Oct. 31, 2016, 11 Pages.
Office Action Issued in Chinese Patent Application No. 201280020368.3, dated Dec. 27, 2016, 10 Pages.
Office Action Issued in Chinese Patent Application No. 201280021905.6, dated Nov. 29, 2016, 11 Pages.
Second Office Action and Search Report Issued in Chinese Patent Application No. 201280020430.9, dated Nov. 1, 2016, 11 Pages.
JP: Office Action Issued in Japanese Patent Application No. 2014-508168, dated Oct. 7, 2016, 8 Pages.
JP: Notice of Allowance Issued in Japanese Patent Application No. 2014-508171, dated Aug. 4, 2016, 4 Pages.
AU: Office Action Issued in Australian Patent Application No. 2012253808, dated Sep. 16, 2016, 3 Pages.
U.S. Appl. No. 14/188,666, Office Action dated Oct. 25, 2016, 24 pgs.
U.S. Appl. No. 13/096,854, Office Action dated Jan. 11, 2017, 39 pgs.
U.S. Appl. No. 13/096,880, Office Action dated Oct. 25, 2016, 20 pgs.
U.S. Appl. No. 13/102,875, Office Action dated Nov. 14, 2016, 27 pgs.
Australian Notice of Allowance in Application 2012253808, dated Nov. 28, 2016, 2 pages.
Chinese Notice of Allowance in Application 201280021954.X, dated Dec. 22, 2016, 4 pages.
Chinese Office Action in Application 201280020441.7, dated Jan. 25, 2017, 10 pages.
Chinese Office Action in Application 201280020430.9, dated Feb. 27, 2017, 8 pages.
Japanese Notice of Allowance in Application 2014-510385, dated Oct. 13, 2016, 4 pages.
Japanese Office Action in Application 2014-510384, dated Oct. 13, 2016, 6 pages.
Taiwanese Notice of Allowance in Application 101110617, dated Nov. 16, 2016, 4 pages.
U.S. Appl. No. 13/096,830, Notice of Allowance dated Nov. 8, 2013, 8 pages.
U.S. Appl. No. 13/096,854, Advisory Action dated Dec. 3, 2014, 5 pages.
U.S. Appl. No. 13/096,869, Advisory Action dated Dec. 3, 2014, 4 pages.
U.S. Appl. No. 13/096,880, Advisory Action dated Jul. 27, 2015, 5 pages.
U.S. Appl. No. 13/096,880, Advisory Action dated Sep. 18, 2015, 3 pages.
U.S. Appl. No. 13/096,880, Advisory Action dated Oct. 15, 2015, 4 pages.
U.S. Appl. No. 13/102,431, Notice of Allowance dated Oct. 14, 2014, 6 pages.
U.S. Appl. No. 13/102,431, Notice of Allowance dated Jan. 27, 2015, 2 pages.
U.S. Appl. No. 14/188,666, Notice of Allowance dated Apr. 20, 2017, 6 pages.
Japaneses Notice of Allowance in Application 2014-510384, dated Mar. 31, 2017, 3 page. (No English Translation.).
Decouchant et al.; "Griffon: A Cooperative, Structured, Distributed Document Editor"; 1993; http://citeseerx.ist.psu.edu/viewdoc/download?doi=10.1.1.51.759&rep=rep1&type=pdf; 28 pages.
Devendorf, G.; "Outlook putting attachments in Sharepoint"; Feb. 13, 2008; http://my.advisor.com/blog/garydev.nsf/d6plinks/GDEF-7BSUA2; 5 pages.
Docstoc; "OneClick: Email Large Documents Without Attaching Files"; retrieved Jan. 7, 2011, from http://www.docstoc.com/oneclick/; 4 pgs.
Edholm, Y.; "Email Attachments: The Scourge of the Network"; Jul. 21, 2008; solutions-daily.com; http://www.solutions-daily.com/dsp_getFeaturesDetails.cfm?CID=691; 3 pg.s.
Egnyte.co; "Cloud File Server Features—Complete List"; accessed Dec. 30, 2010, at http://www.egnyte.co.uk/file-server/online-file-server-features.html; 5 pgs.
Gigaom.com; "How to Use Adobe Acrobat for Online Document Reviews"; Retrieved Date: Jan. 4, 2010; http://gigaom.com/collaboration/how-to-use-adobe-acrobat-for-online-document-reviews/; 8 pgs.
Harmoni.ie; "harmon.ie for SharePoint"; accessed Apr. 1, 2011 at http://harmon.ie/SharePoint/Product/Features/CollaborateUsingDocuments; 3 pgs.
Hsieh, H., et al.; "Activity Links: Supporting Communication and Reflection about Action"; Center for the Study of Digital Libraries and Dept. of Computer Science, Texas A&M University, USA; HT '05 Sep. 6-9, 2005, Salzburg, AT; 10 pgs.
Jatowt, A., et al.; "Change Summarization in Web Collections"; University of Tokyo, Japan; 2004; accessed on or about Jan. 4, 2010 at http://citeseerx.ist.psu.edu/viewdoc/download?doi=10.1.1.73.7999&rep=rep1&type=pdf; 10 pgs.
Lenahan, T.; "5 New Google Docs Features You Might Have Missed"; Apr. 6, 2010; http://www.makeuseof.com/tag/5-google-docs-features-making/; 9 pgs.
Masternewmedia.org; "Collaborative Document Review Online: PleaseReview"; Retrieved Date: Jan. 4, 2010; http://www.masternewmedia.org/news/2005/06/02/collaborative_document_review_online_pleasereview.htm; 4 pgs.
Masternewmedia.com; "How to Send Large Files without Email"; Last updated: Jan. 6, 2011; retrieved Jan. 7, 2011, from http://www.masternewmedia.org/how_to_send_large_files_without_email/; 3 pgs.
McCoy, J., et al.; "SharePoint Workspace and the Office Document Cache"; Mar. 12, 2010-Sep. 29, 2010; retrieved Dec. 30, 2010, at http://blogs.msdn.com/b/sharepoint_workspace_development_team/archive/2010/03/12/sharepoint-workspace-and-the-office-document-cache.aspx; 2 pgs.
Microsoft Support; "Attachment Manager for Outlook"; accessed Jan. 7, 2011, at http://assistmyteam.com/downloads/manuals/AttachmentManager.pdf; 14 pgs.
Microsoft Support; "OL2000: Changing from Local Delivery to Server and Offline"; Oct. 8, 2003, rev. 1.0; accessed Jan. 7, 2011 at http://support.microsoft.com/kb/197651; 4 pgs.
Microsoft Support; "You may receive an 'Outlook blocked access to the following potentially unsafe attachments' message in Outlook"; Last Review: May 13, 2010; http://support.microsoft.com/kb/829982; 7 pgs.
Microsoft; "Going beyond e-mail: Collaborating with Office"; Retrieved Date: Jan. 4, 2010; http://office.microsoft.com/en-us/outlook-help/going-beyond-e-mail-collaborating-with-office-HA001017429.aspx; 10 pgs.
MSDN.com; "How to Share Large Files Without Attaching Them"; Aug. 21, 2008; retrieved Jan. 7, 2011, from http://blogs.msdn.com/b/outlook/archive/2008/08/21/how-to-share-large-files-without-attaching-them.aspx; 3 pgs.
Office-Addins.com; "Attachments Processor for Microsoft Outlook"; accessed Jan. 6, 2011, at http://www.-office-addins.com/-outlook-addins/attachments-processor.html; 3 pgs.
phpBB—Free and Open Source Forum Software; "Display last edited time information"; accessed Jan. 6, 2011, at http://www.phpbb.com/community/viewtopic.php?f=46&t=589514; 7 pgs.
Redline-Software.com; "Outlook Connector for MDaemon"; accessed Jan. 6, 2011, at http://www.redline-software.com/eng/support/docs/mdaemon/c6s4.php; 7 pgs.
RSBR.de; "Outlook Attachment Sniffer"; accessed Jan. 6, 2011, at http://www.rsbr.de/Software/OASniffer/index.htm; 2 pgs.
Sendthisfile.com; "Welcome to SendThisFile"; accessed Jan. 7, 2011, from http://www.sendthisfile.com/; 1 pg.
Sharepoint Development; "How to show last modified workflow date in a column on the main list page"; Jul. 31, 2009-Aug. 4, 2009; accessed Jan. 6, 2011, at http://www.sharepointdev.net/sharepoint--design-customization/how-to-show-last-modified-workflow-date--in-a-column-on-the-main-list-page-5094.shtml; 4 pgs.

(56) References Cited

OTHER PUBLICATIONS

Thapa, S.; "Microsoft SharePoint 2010—Features and Benefits"; Dec. 1, 2010; EzineMark.com; 3 pgs.
The Daily Reviewer; "Outlook Shared Attachment as Hyperlink"; accessed Dec. 30, 2010, at http://thedailyreviewer.com/windowsapps/view/outlook-shared-attachment-as-hyperlink-11367085; 5 pgs.
Troost et al., Internet Engineering Task Force, RFC 2183 dated Aug. 1997, 12 pgs. available at: www.rfc-editor.org/rfc/rfc2183.txt (from advisory Action dated Dec. 3, 2014).
Wikipedia, Message, http://en.wikipedia.org/wiki1Message retrieved Jan. 9, 2014, p. 1-2.
U.S. Appl. No. 12/963,091, entitled *Shared Attachments*, filed Dec. 8, 2010.
U.S. Appl. No. 13/096,830 entitled *Making Document Changes by Replying to Electronic Messages*, filed Apr. 28, 2011.
U.S. Appl. No. 13/096,854 entitled *Presenting Links to Content as Attachments in Electronic Messages*, filed Apr. 28, 2011.
U.S. Appl. No. 13/096,869, entitled *Presenting Link Information Near Links Within Electronic Messages*, filed Apr. 28, 2011.
U.S. Appl. No. 13/096,880, entitle *Upload of Attachment and Insertion of Link Into Electronic Messages*, filed Apr. 28, 2011.
U.S. Appl. No. 13/096,899, entitled *Storing Metadata Inside File to Reference Shared Version of File*, filed Apr. 28, 2011.
U.S. Appl. No. 13/102,431, entitled *Changes to Documents are Automatically Summarized in Electronic Messages*, filed May 6, 2011.
U.S. Appl. No. 13/102,875, entitled *Setting Permissions for Links Forwarded in Electronic Messages*, filed May 6, 2011.
U.S. Appl. No. 13/096,910, entitled "Uploading Attachment to Shared Location and Replacing with a Link", filed May 12, 2012.
U.S. Appl. No. 13/096,936, entitled *Automatic Uploading of Attachment to a Shared Location*, filed Apr. 28, 2011.
PCT Search Report in PCT/US2012/035710 dated Sep. 28, 2012.
PCT Search Report in PCT/US2012/035707 dated Nov. 26, 2012.
PCT Search Report in PCT/US2012/035708 dated Nov. 26, 2012.
PCT Search Report in PCT/US2012/035709 dated Nov. 26, 2012.
PCT Search Report in PCT/US2012/036701 dated Nov. 28, 2012.
PCT Search Report in PCT/US2012/036702 dated Dec. 3, 2012.
EP Extended Search Report in PCT/US2012/036702 dated Aug. 12, 2014, 6 pgs.
EP Extended Search Report in PCT/US2012/035708 dated Aug. 29, 2014, 6 pgs.
EP Extended Search Report in PCT/US2012/035709 dated Sep. 22, 2014, 6 pgs.
EP Extended Search Report in PCT/US2012/035707 dated Oct. 21, 2014, 6 pgs.
EP Search Report in PCT/US2012/036701 dated Dec. 4, 2014, 5 pgs.
Office Action dated Jun. 20, 2012, issued in U.S. Appl. No. 13/096,899.
Office Action dated Sep. 7, 2012, issued in U.S. Appl. No. 12/963,0919.
Office Action dated Oct. 3, 2012, issued in U.S. Appl. No. 12/096,830.
Office Action dated Nov. 13, 2012, issued in U.S. Appl. No. 13/096,910.
Office Action dated Nov. 21, 2012, issued in U.S. Appl. No. 13/096,936.
Office Action dated Nov. 26, 2012, issued in U.S. Appl. No. 13/102,431.
Office Action dated Dec. 11, 2012, issued in U.S. Appl. No. 13/096,854.
Office Action dated Dec. 14, 2012, issued in U.S. Appl. No. 13/096,869.
Office Action dated Dec. 26, 2012, issued in U.S. Appl. No. 13/096,880.
Office Action dated Jan. 9, 2013, issued in U.S. Appl. No. 12/963,091.
Office Action dated Feb. 11, 2013, issued in U.S. Appl. No. 13/096,899.
Office Action dated Jun. 4, 2013, issued in U.S. Appl. No. 13/096,936.
Office Action dated Jun. 10, 2013, issued in U.S. Appl. No. 13/102,431.
Office Action dated Jun. 11, 2013, issued in U.S. Appl. No. 13/096,910.
Office Action dated Jun. 20, 2013, issued in U.S. Appl. No. 13/096,854.
Office Action dated Jun. 21, 2013, issued in U.S. Appl. No. 13/096,830.
Office Action dated Jun. 21, 2013, issued in U.S. Appl. No. 13/096,869.
Office Action dated Jul. 16, 2013, issued in U.S. Appl. No. 13/096,880.
Office Action dated Sep. 24, 2013, issued in U.S. Appl. No. 13/096,899.
Office Action dated Nov. 22, 2013, issued in U.S. Appl. No. 13/102,875.
Office Action dated Jan. 15, 2014, issued in U.S. Appl. No. 13/096,854.
Office Action dated Jan. 31, 2014, issued in U.S. Appl. No. 13/096,869, 28 pgs.
Office Action dated Apr. 8, 2014, issued in U.S. Appl. No. 13/102,431, 16 pgs.
Office Action dated Jun. 16, 2014, issued in U.S. Appl. No. 12/963,091, 22 pgs.
Office Action dated Jul. 10, 2014, issued in U.S. Appl. No. 13/096,869, 29 pgs.
Office Action dated Jul. 16, 2014, issued in U.S. Appl. No. 13/102,431, 20 pgs.
Office Action dated Aug. 14, 2014, issued in U.S. Appl. No. 13/096,854, 32 pgs.
Office Action dated Sep. 25, 2014, issued in U.S. Appl. No. 12/963,091, 24 pgs.
Office Action dated Sep. 26, 2014, issued in U.S. Appl. No. 13/096,936, 29 pgs.
Office Action dated Oct. 6, 2014, issued in U.S. Appl. No. 13/096,880, 31 pgs.
Office Action dated Oct. 7, 2014, issued in U.S. Appl. No. 13/096,910, 32 pgs.
Office Action dated Oct. 23, 2014, issued in U.S. Appl. No. 13/096,899, 24 pgs.
Office Action dated Apr. 9, 2015, issued in U.S. Appl. No. 13/096,936, 23 pgs.
Office Action dated Apr. 20, 2015, issued in U.S. Appl. No. 13/096,880, 25 pgs.
Notice of Allowance dated Apr. 28, 2015, issued in U.S. Appl. No. 13/096,910, 23 pgs.
Notice of Allowance dated Jun. 15, 2015, issued in U.S. Appl. No. 12/963,091, 28 pgs.
Office Action dated Jun. 23, 2015, issued in U.S. Appl. No. 13/096,899, 30 pgs.
Office Action dated Jun. 26, 2015, issued in U.S. Appl. No. 13/096,854, 50 pgs.
Chinese Office Action and Search Report Issued in Chinese Patent Application No. 201280020441.7, dated Dec. 15, 2015, 18 Pages.
Chinese Office Action dated Dec. 29, 2015 in Appln No. 201280021954.x, 16 pgs.
Chinese Office Action dated Feb. 1, 2016 in Appln No. 201280020342.9, 12 pgs.
Chinese Office Action dated Mar. 4, 2016 in Appln No. 201280020430.9, 11 pgs.
European Office Action Issued in Application No. 12777397.6 , dated Mar. 3, 2016, 6 pgs.
Japanese Office Action Issued in Patent Application No. 2014-508168, dated Mar. 23, 2016, 8 Pages.
Japanese Office Action Issued in Patent Application No. 2014-508169, dated Feb. 10, 2016, 11 Pages.
Japanese Office Action Issued in Patent Application No. 2014-508170, dated Mar. 22, 2016, 5 Pages.
Japanese Office Action Issued in Patent Application No. 2014-508171, dated Mar. 11, 2016, 6 Pages.
Taiwan Office Action and Search Report Issued in Taiwan Patent Application No. 101110617, dated Mar. 21, 2016, 6 Pages.
U.S. Appl. No. 13/096,854, Office Action dated May 2, 2016, 35 pgs.
U.S. Appl. No. 13/096,880, Office Action dated Feb. 19, 2016, 19 pgs.

(56) References Cited

OTHER PUBLICATIONS

U.S. Appl. No. 13/096,936, Office Action dated Mar. 22, 2016, 20 pgs.
U.S. Appl. No. 14/188,666, Office Action dated Feb. 26, 2016, 77 pgs.
U.S. Appl. No. 13/102,875, Office Action dated Apr. 20, 2016, 22 pgs.
Toyoko Abe et al.; "Object Bulletin Board for Group Cooperative Work" printed in a collection of papers (1997-2006 Version 1.1) presented at DICOMO symposium sponsored by Information Processing Society of Japan on Aug. 31, 2006 (pp. 513-518) (DVD-ROM), 8 pages.
Japanese Office Action Issued in Patent Application No. 2014-510384, dated May 9, 2016, 6 Pages.
Russian Office Action Issued in Patent Application No. 2013149178, dated May 20, 2016, 8 Pages. No English Translation.
Chinese Office Action in Application 201280020441.7, dated Jun. 2, 2017, 9 pages.
U.S. Appl. No. 13/096,880, Office Action dated Jun. 14, 2017, 13 pages.
U.S. Appl. No. 14/188,666, Supplemental Notice of Allowance dated Jul. 11, 2017, 2 pages.
U.S. Appl. No. 13/096,854, Office Action dated Jun. 29, 2017, 29 pages.
U.S. Appl. No. 13/102,875, Office Action dated Jul. 5, 2017, 19 pages.
U.S. Appl. No. 14/188,666, Supplemental Notice of Allowance dated Jul. 26, 2017, 2 pages.
Russian Notice of Allowance in Application 2013149178, dated Jun. 15, 2017, 17 pages.
U.S. Appl. No. 14/887,086, Office Action dated Oct. 6, 2017, 16 pages.
Chinese Notice of Allowance in Application 201280020430.9, dated Aug. 29, 2017, 4 pages.
U.S. Appl. No. 13/096,899, Office Action dated Aug. 15, 2017, 24 pages.
Chinese Office Action in Application 201280021905.6, dated Sep. 19, 2017, 9 pages.
Korean Office Action in Application 10-2013-7028430, dated Oct. 23, 2017, 11 pages.
Chinese Office Action in Application 201280020342.9, dated Sep. 29, 2017, 11 pages.
European Communication in Application 12777074.1, dated Oct. 16, 2017, 7 pages.
Korean Office Action in Application 10-2013-7028280, dated Oct. 21, 2017, 11 pages.
Chinese Office Action in Application 201280020368.3, dated Nov. 6, 2017, 10 pages.
Korean Office Action in Application 10-2013-702827, dated Oct. 23, 2017, 11 pages.
Korean Office Action in Application 10-2013-7029294, dated Oct. 23, 2017, 10 pages.
Korean Office Action in Application 10-2013-7029310, dated Nov. 28, 2017, 7 pages.
U.S. Appl. No. 13/096,854, Office Action dated Dec. 28, 2017, 29 pages.
Re@DNotify, How to forward emails "As Attachments", Retrieved on Jul. 2, 2009 by the WayBack Machine, 7 pages.
European Office Action in Application 12777397.6, dated Jan. 3, 2018, 6 pages.
European Summons in Application 12782951.3, dated Feb. 13, 2018, 7 pages.
Canadian Office Action in Application 2835323, dated Jan. 25, 2018, 4 pages.
U.S. Appl. No. 14/887,086, Office Action dated Jan. 26, 2018, 19 pages.
Chinese Decision on Reexamination in Application 201280020342.9, dated Mar. 30, 2018 15 pages.
Chinese Notice of Allowance in Application 201280021905.6, dated Mar. 27, 2018, 4 pages.
U.S. Appl. No. 13/096,899, Office Action dated Mar. 19, 2018, 20 pages.
U.S. Appl. No. 13/102,875, Office Action dated Mar. 16, 2018, 18 pages.
U.S. Appl. No. 14/887,086, Notice of Allowance dated Jun. 6, 2018, 7 pages.
Chinese Office Action in Application 201280020368.8, dated Apr. 8, 2018, 18 pages.
Chinese Office Action in Application 201280020441.7, dated May 4, 2018, 8 pages.
European Extended Search Report in Application 12776501.4, dated Jun. 6, 2018, 7 pages.
Korean Notice of Allowance in Application 10-2013-7029310, dated May 21, 2018, 4 pages.
Korean Office Action in Application 10-2013-7028277, dated Apr. 30, 2018, 5 pages.
Korean Office Action in Application 10-2013-7028280, dated May 21, 2018, 14 pages.
Korean Office Action in Application 10-2013-7028430, dated May 14, 2018, 8 pages.
"Final Office Action Issued in U.S. Appl. No. 13/096,854", dated Jul. 23, 2018, 25 Pages.
"Office Action Issued in Korean Patent Application No. 10-2013-7028430", dated Jun. 28, 2018, 08 Pages.
"Office Action Issued in Korean Patent Application No. 10-2013-7029294", dated May 28, 2018, 05 Pages.
"Office Action Issued in Korean Patent Application No. 10-2013-7028223", dated Jul. 17, 2018, 9 Pages.

* cited by examiner

UPLOADING ATTACHMENT TO SHARED LOCATION AND REPLACING WITH A LINK

CROSS REFERENCE TO RELATED APPLICATION

This application is a continuation of and claims priority to application Ser. No. 13/096,910, now U.S. Pat. No. 9,137,185, filed Apr. 28, 2011, entitled UPLOADING ATTACHMENT TO SHARED LOCATION AND REPLACING WITH A LINK and is hereby incorporated in its entirety by reference.

BACKGROUND

Users routinely attempt to send large attachments using electronic messages. Many message gateways limit the size of an attachment that may be delivered/received. The message including the attachments is not delivered when the size of an attachment or collection of attachments exceeds these limits. The sender of the message containing the attachment may or may not be notified that the message was not delivered.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The size of attachments to an electronic message are examined before the message is sent to determine if the attachments exceed a size threshold. When the size of the attachments exceed the threshold, one or more of the attachments are uploaded to a shared location that is accessible to the recipients of the message. A link replaces each attachment that was uploaded to the shared location. Permissions are automatically set at the shared location such that each of the recipients of the message are able to access the uploaded attachment.

DETAILED DESCRIPTION

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Figure 1:
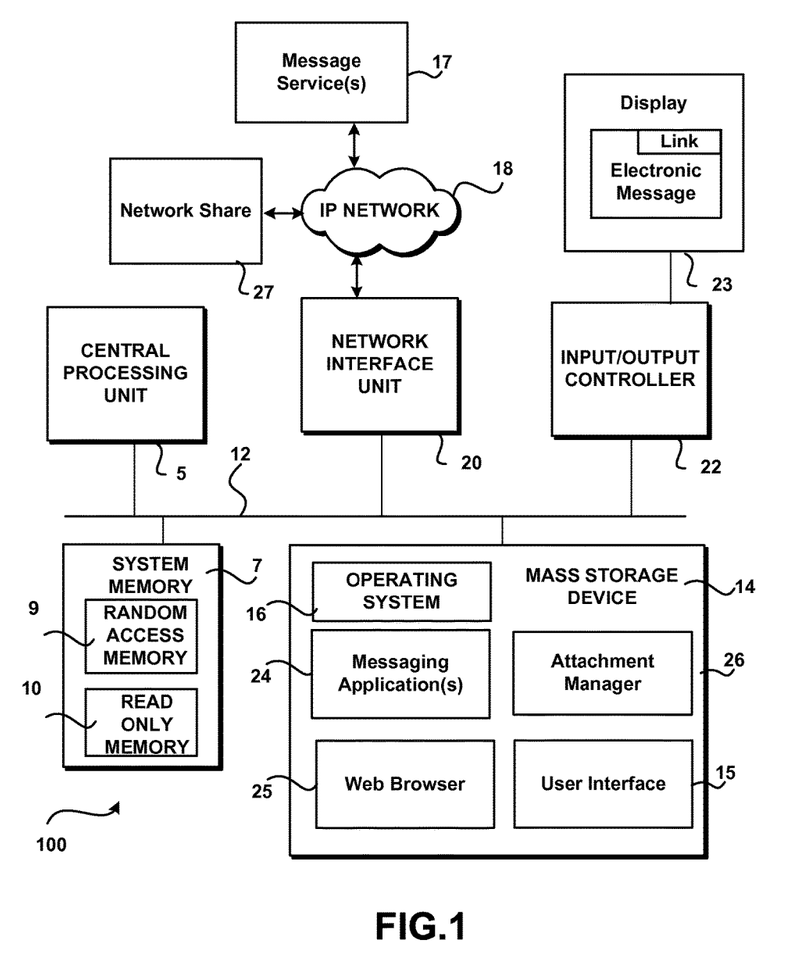
FIG. 1 illustrates an exemplary computing environment.

Referring now to FIG. 1, an illustrative computer environment for a computer 100 utilized in the various embodiments will be described. The computer environment shown in FIG. 1 includes computing devices that each may be configured as a mobile computing device (e.g. phone, tablet, net book, laptop), server, a desktop, or some other type of computing device and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, messaging application(s) 24, Web Browser 25, and attachment manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide input/output to a display screen 23, a printer, or other type of output device.

As mentioned briefly above, a number of program modules and data files may be stored in the mass storage device 14 and RAM 9 of the computer 100, including an operating system 16 suitable for controlling the operation of a computer, such as the WINDOWS PHONE 7®, WINDOWS 7®, or WINDOWS SERVER® operating system from MICROSOFT CORPORATION of Redmond, Wash. The mass storage device 14 and RAM 9 may also store one or more program modules. In particular, the mass storage device 14 and the RAM 9 may store one or more application programs, including one or more messaging application(s) 24 and Web browser 25.

A user interface 15 is used by a user to interact with applications and documents. Messaging application(s) 24 may be one or more different messaging applications. For example, computer 100 may include an email application, an Instant Messaging (IM) application, an SMS, MMS application, a real-time information network (e.g. Twitter® interface), a social networking application, and the like. According to an embodiment, messaging application 24 is an email application, such as MICROSOFT OUTLOOK®. The messaging application(s) may be client based and/or web based. For example, a network based message service 17 may be used, such as: MICROSOFT WINDOWS LIVE or some other network based email and messaging service.

Network share 27 is configured to store content (e.g. documents, spreadsheet, Web content, and the like) that are accessible to one or more users through IP network 18. For example, network share 27 may store content that is accessible by users located at one or more locations.

Attachment manager 26 is configured to upload attachments that exceed a size threshold and replace the attachment with a link in the message. The term "link" refers to an address that represents a location of content. For example, a link may be in the form of a Uniform Resource Locator (URL) that specifies a network location of where the attachment/content is stored. Clicking the link generally retrieves the content that is pointed to by the link. Attachment manager 26 may be located externally from an application, e.g. messaging application 24, as shown or may be a part of an application. Further, all/some of the functionality provided by attachment manager 26 may be located internally/externally from a messaging application.

According to an embodiment, attachment manager 26 is configured to present linked content and/or attachments in an attachment area of an electronic message for easier access than having to locate the link within the body of the message. Attachment manager 26 automatically determines the size of attachments to an electronic message before the message is sent. When the size of the attachments exceed the predetermined threshold, one or more of the attachments are uploaded to a shared location that is accessible to the recipients of the message. A link replaces each attachment within the message that was uploaded to the shared location. Attachment manager 26 automatically sets the permissions of the attachment(s) at the shared location such that each of the recipients of the message are able to access the uploaded attachment(s). The attachments may be many different types of content, such as word processing documents, spreadsheets, slides, website content and the like. When the message is delivered to the recipient, the attachment that is addressed by the link may be automatically downloaded and included with the display of the link or in place of the link within the message. More details regarding the attachment manager are disclosed below.

Figure 2:
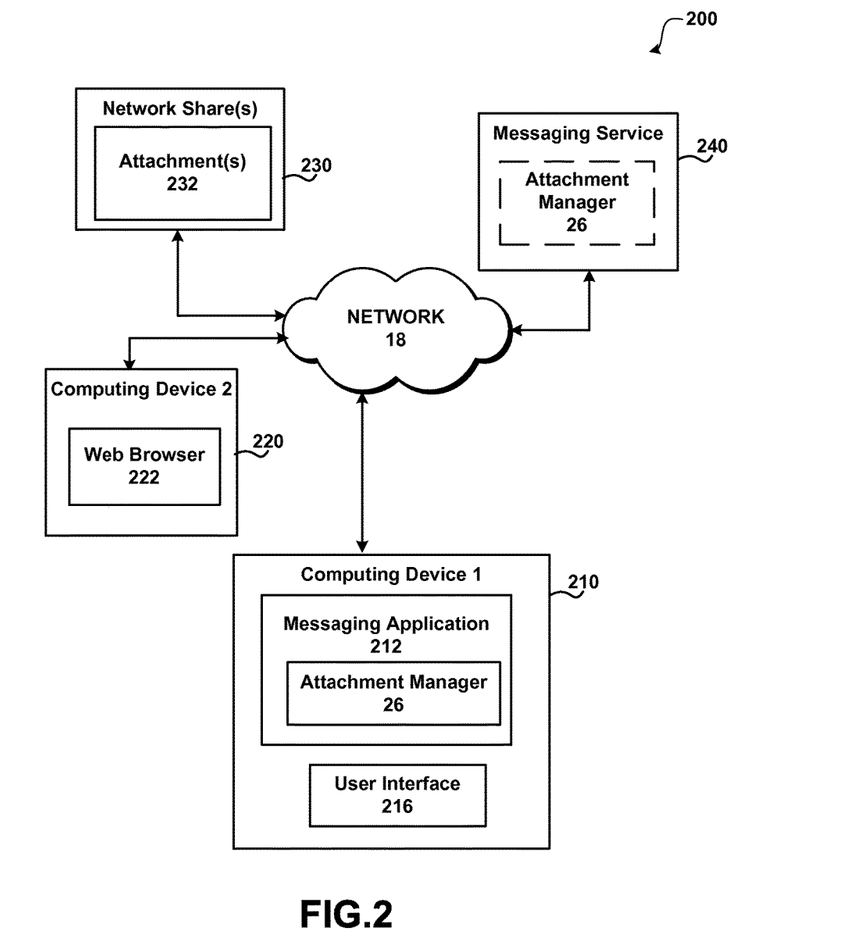
FIG. 2 shows a system for uploading attachments that exceed a threshold to a shared location and replacing the uploaded attachment with a link within the message.

FIG. 2 shows a system for uploading attachments that exceed a threshold to a shared location and replacing the uploaded attachment with a link within the message. As illustrated, system 200 includes computing device 1 (210), computing device 2 (220), network share(s) 230 and messaging service 240.

The computing devices may be any type of computing device that is configured to perform the operations relating to sending and receiving electronic messages that include attachments and links to content. For example, some of the computing devices may be: mobile computing devices (e.g. cellular phones, tablets, smart phones, laptops, and the like); desktop computing devices and servers. Some computing devices may be arranged to provide an online service (e.g. messaging service 240 that is configured for sending and receiving electronic messages), some may be arranged as data shares, some may be arranged in local networks, some may be arranged in networks accessible through the Internet, and the like.

The computing devices are coupled through network 18. Network 18 may be many different types of networks. For example, network 18 may be an IP network, a carrier network for cellular communications, and the like. Generally, network 18 is used to transmit data between computing devices, such as computing device 1, computing device 2, network share 230 and messaging service 240.

Computing device 1 includes messaging application 212 and user interface 216. As illustrated, computing device 1 is used by a user to interact with electronic messages, content in a network share (e.g. attachment 232) and the like.

User interface (UI) 216 is used to interact with an application and content, such as messaging application 212 and attachment(s) 232. One or more user interfaces of one or more types may be used to interact with the content. For example, UI 216 may include the use of a context menu, a menu within a menu bar, a menu item selected from a ribbon user interface, a graphical menu, and the like. Generally, UI 216 is configured such that a user may easily interact with content and electronic messages. For example, a user may simply select an option within UI 216 to automatically upload and permission an attachment that exceeds a predetermined size to a shared location. UI 216 may also be used to set permissions for the attachment at the shared location and to access the attachment and/or link to the attachment.

Upon receipt of the message, the recipient of the message may access the uploaded attachment using the link within the received message. According to an embodiment, the attachment is downloaded to the recipient's device automatically. The link to the attachment may/may not be removed from the message when the attachment is downloaded. For example, upon receipt of the message including the link to the attachment, attachment manager 26 may automatically download the attachment, remove the link from the message and attach the downloaded attachment to the message. In this way, the recipient receives the message as if the attachment was delivered with the message.

Messaging application 212 may be a client based application, such as an email application, an Instant Messaging Application, a social media application, and the like. Generally, messaging application 212 is used to send and receive electronic messages of one or more types. A network based messaging service 240 may be used in addition to messaging application 212 or instead of one or more of the different messaging applications. For example, a web interface may be used to access messaging service 240.

Messaging service 240 may be used to process electronic messages between one or more computing devices, such as computing device 1 and computing device 2. Messaging service 240 may be configured to process different message types, such as SMS, MMS, email, messages for social networks and the like. Messaging service 240 may be configured with the functionality of attachment manager 26 and one or more message types may be used to communicate the electronic messages including links to the uploaded attachment(s).

Computing device 2 includes one or more applications, such as a web browser (222) that may be configured to access a messaging service, such as a web based email service and to interact with content. For example, a web browser may be used to access messaging service 240 and create an electronic message including one or more attachments.

One or more network shares (e.g. Network share 230) may be used to store content. The content may be any type of content that is linked/attached within a message, such as word processing documents, spreadsheets, slides, website content and the like Network share 230 is accessible by the computing devices that interact with the content. The network share may be associated with an online service that supports online access/interaction with content. The network share(s) may be associated with one or more online services. For example, different network shares may be associated with different types of attachments (e.g. a network share for a video service, picture service, document service, and the like.)

Attachment manager 26 is configured to detect any attachments to an electronic message and determine when one or more of the attachments is to be uploaded to a network share based on a size of the attachments. The attachments may be to any type of content, such as word processing documents, spreadsheets, slides, pictures, videos, website content and the like. Attachment manager 26 determines if one or more or a combination of attachments exceed a predetermined size threshold. According to an embodiment, the predetermined size threshold is based on a size restriction of a message gateway that sets a maximum size limitation for an electronic message (e.g. 1 MB, 5 MB, 10 MB . . . ). The predetermined size threshold may be configured by an authorized user (e.g. system administrator). When one or more of the attachments exceed the threshold, attachment manager 26 is configured to upload one or more of the attachments. For example, all/portion of the attachments may be uploaded to the shared location and removed from the message such that the size of the message when it is sent is below the threshold. When one attachment or a combination of the attachments exceed the threshold, each attachment to the message is uploaded to the shared location. Each attachment that is uploaded is replaced with a link to the attachment at the shared location within the message. According to an embodiment, the link(s) are placed within an attachment area of the electronic message such that when a user receives the message the links to the uploaded attachments are easily locatable. A single link may also be used to address all of the attachments that were uploaded to the shared location (e.g. the link may point to a folder containing the uploaded attachments). The attachments may be uploaded before the message is sent and/or after the message is sent. According to an embodiment, the attachments are uploaded before a message is sent such that any errors in uploading the attachment to the shared location may be presented to the sender of the electronic message before the message is sent.

According to an embodiment, any attachments that were uploaded due to the size exceeding the threshold are automatically downloaded and included within the attachment area before the user receiving the message views the message. For example, upon receipt of the message, the linked attachment may be automatically downloaded and included with the message. All/some of the linked content may be automatically downloaded. The links to the attachments may/may not be removed from the message after the attachments are downloaded.

Figure 3:
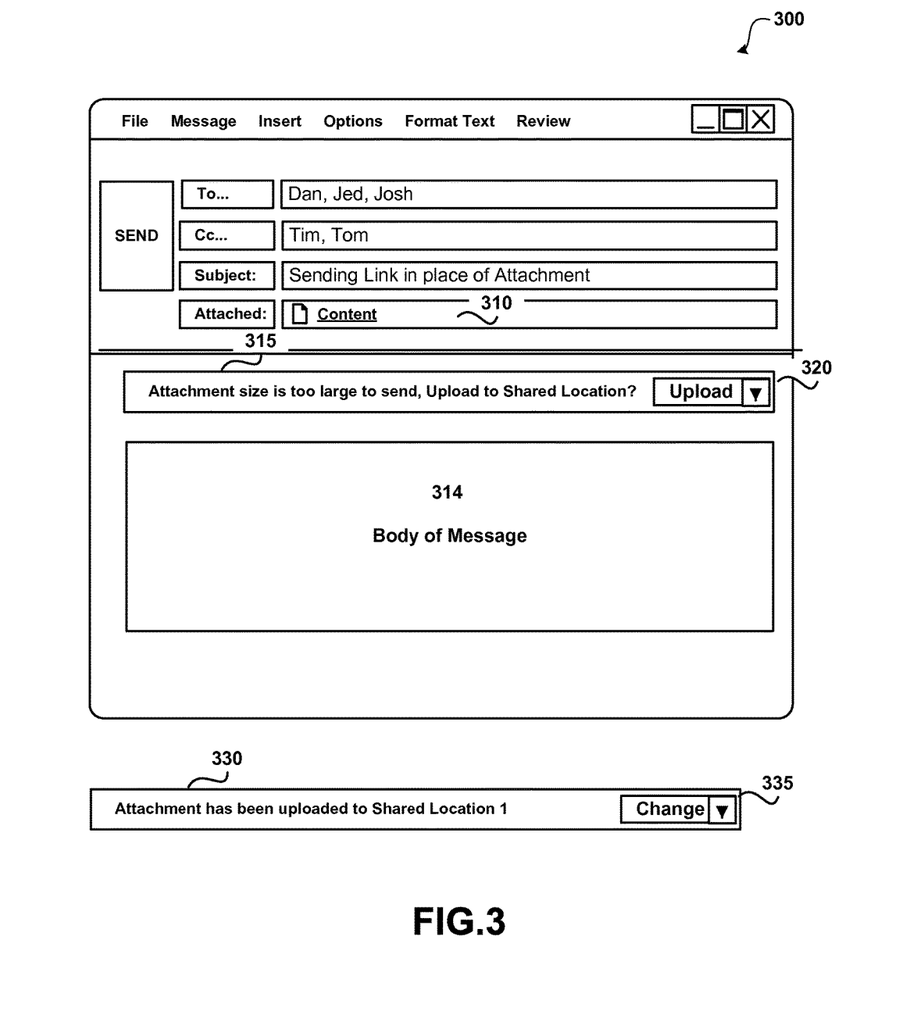
FIG. 3 shows a display of an electronic message including an attachment.
Figure 4:
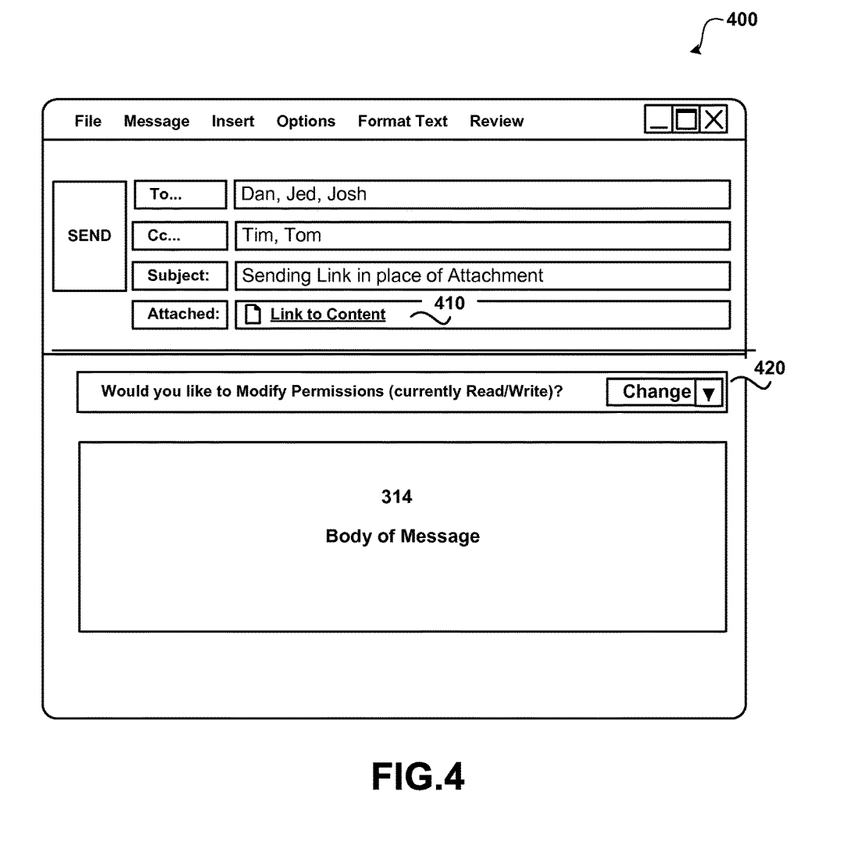
FIG. 4 shows a display of an electronic message including a link to an attachment that has been uploaded to a shared location.
Figure 5:
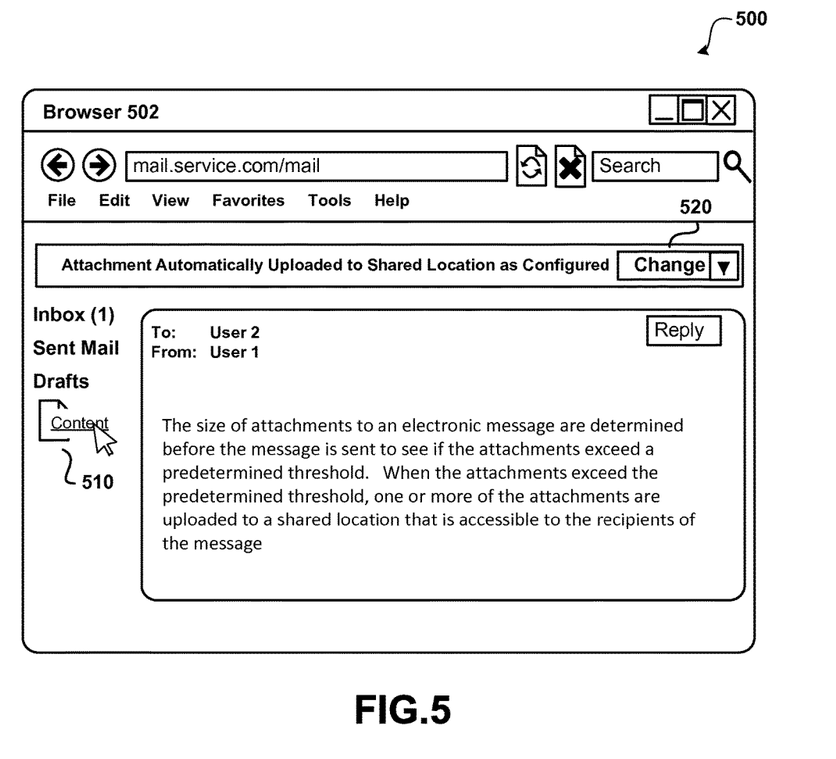
FIG. 5 shows a display of an electronic message within a Web browser including a link to content.

FIGS. 3-5 show exemplary electronic messages where an attachment is uploaded to a shared location and replaced with a link within the message. FIGS. 3-5 are for exemplary purpose and are not intended to be limiting.

FIG. 3 shows a display of an electronic message including an attachment. As illustrated, message 300 comprises a To: field, a Cc: field, a Subject field, an Attached field that includes attachment 310; body of the message 314 and upload option 320. More or fewer fields may be included with the electronic message.

The electronic message may be accessed a number of ways. For example, a web browser may access an electronic mail service, an email application on a computing device may be configured to send/receive emails from one or more different services, and the like.

When electronic message is created, attachment 310 is included with the message. The attachments may be to any type of content, such as word processing documents, spreadsheets, slides, websites and the like. Generally, the attachment may be to any type of content that is accessible by a computing device.

When a size of an attachment (or a combination of attachments) exceeds a predetermined size, message 315 may be presented to inform the sender that the size of the attachments are too large to send. Other messages may be displayed to the user indicating that the size of the attachment is too large to send. According to an embodiment, upload option 320 is presented that allows a user to select the upload option before the attachment is uploaded to a shared location. The attachment may be automatically uploaded to a shared location without providing upload option 320. For example, a user may have previously configured an automatic upload option to upload any attachments without user confirmation to a shared location. In this scenario, a message, such as message 330, may be provided along with change option 335 that provides a user with options relating to the attachment (e.g. change permissions for the attachment, move the attachment to a different shared location, remove the attachment from the shared location, and the like.)

FIG. 4 shows a display of an electronic message including a link to an attachment that has been uploaded to a shared location. As illustrated, message 400 comprises a To: field, a Cc: field, a Subject field, an Attached field that includes link to attachment 410; body of the message 314 and change option 320. More or fewer fields may be included with the electronic message.

When one or more of the attachments are uploaded to a shared location, change option 430 may be used to make changes relating to the attachment. For example, a user may select change option to change the permissions for access to the uploaded attachment at the shared location. For example, some of the recipients may have permissions set that allow them read/write access, other recipients may only have read access. Permissions may also be set to control the forwarding of the attachment/link to the attachment (e.g. prevent an unauthorized user from receiving the attachment and/or a link to the attachment).

According to an embodiment, the link to the uploaded content (410) is located within an attachment area of the message such that the user does not have to search for the linked content within the body of the electronic message.

The attachment area may be located within many different areas of the display. Generally, the attachment area is located such that the display of the attached area remains visible even though the body of the message is scrolled to change the view of the message. A graphical indicator, such as an icon, may be displayed within the attachment area near the link to provide additional information relating to the attachment. The graphical indicator may be selected to indicate a type of the content and/or other characteristics relating to the linked content. For example, a document icon may be used to show the content is a document, a web icon may be used for web content, a spreadsheet icon may be used for spreadsheets, a picture icon may be used for pictures, a message icon may be used for messages, an online service icon may be used to show where the attachment has been uploaded (e.g. a video service icon to indicate that the attachment has been uploaded to video service 1, a picture service icon . . . ) and the like.

FIG. 5 shows a display of an electronic message within a Web browser including a link to content. As illustrated, Web browser 502 shows a message that includes a link 510 to content that has been automatically uploaded. In the current example, change option 520 provides the sender with the one or more menu options that relate to the attachment that was uploaded due to size limitations (e.g. setting permissions, changing default shared locations for one or more message types, removing an attachment from a shared location, and the like).

Figure 6:
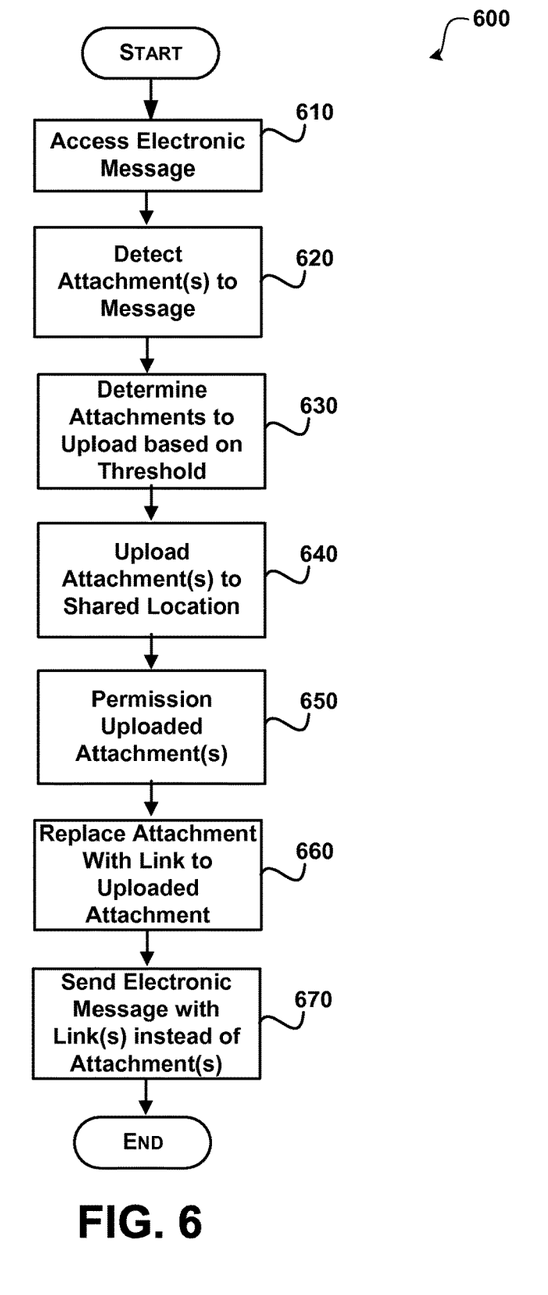
FIG. 6 illustrates a process for uploading attachments that exceed a threshold to a shared location.
Figure 7:
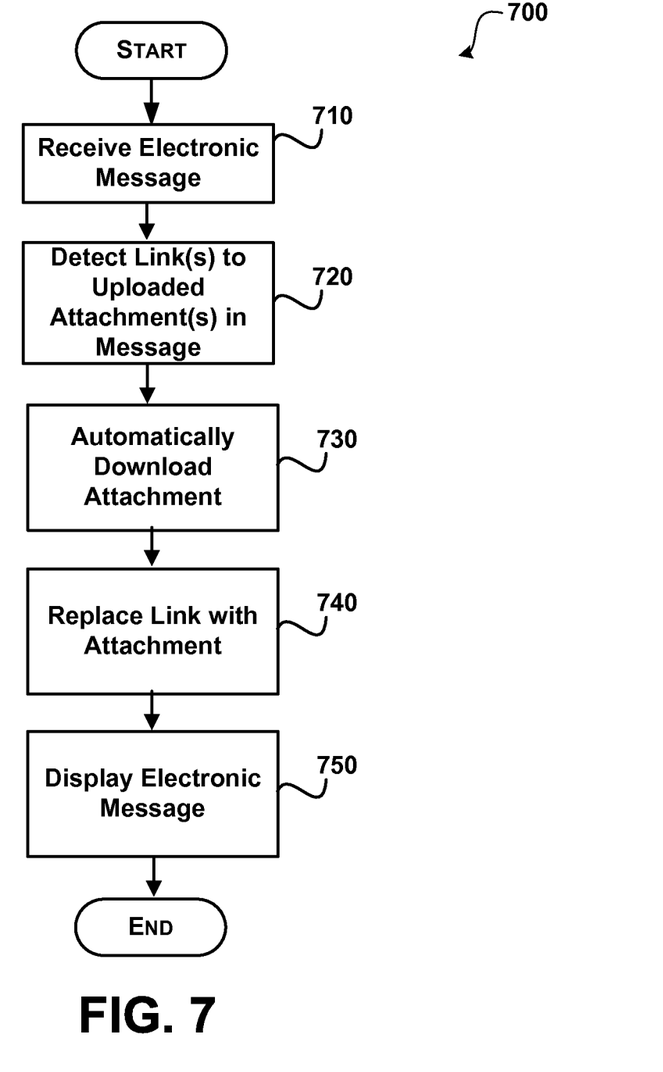
FIG. 7 shows a process for automatically downloading content that is associated with a received message that includes a link to an uploaded attachment.

FIGS. 6 and 7 shows an illustrative process for uploading attachments that exceed a threshold to a shared location and automatically downloading attachments in a received message. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 6 illustrates a process for uploading attachments that exceed a threshold to a shared location.

After a start block, process 600 moves to operation 610, where the electronic message is accessed. The electronic message may be any electronic message that includes the ability to attach content. According to an embodiment, the electronic messages are email messages. Other messages may also be used attachments, such as SMS, MMS, Instant Messages, social network messages, and the like.

Flowing to operation 620, any attachments that are associated with the electronic message are detected. According to an embodiment, the detection occurs before the message is sent. A size of the attachment(s) is also determined.

Moving to operation 630, a determination is made as to what attachments are to be uploaded based on determining that the size of the attachments exceed a predetermined size threshold. According to an embodiment, the predetermined size threshold is based on a size limitation for delivery of an electronic message (e.g. 1 MB, 5 MB, 10 MB . . . ). The predetermined size threshold may be configured by a user (e.g. system administrator). When one or more of the attachments exceed the threshold, attachment manager 26 is configured to upload one or more of the attachments. For example, all/portion of the attachments may be uploaded to the shared location such that when the uploaded attachments are removed from the message, the size of the message is below the threshold. According to an embodiment, if any one attachment is uploaded, each attachment within the message is uploaded.

Transitioning to operation 640, the determined attachments are uploaded to one or more shared locations. The attachments may be uploaded to shared locations based on different criteria. For example, a shared location may be selected based on a type of the attachment (e.g. video attachments to a shared location that hosts videos, picture attachments to a shared location that hosts pictures, documents to a shared location that hosts documents, and the like.) A shared location may also be selected based on shared locations that are selected by the sender and/or one or more of the recipients. For example, each recipient may have configured preferences indicating a desired shared location. The attachment may be uploaded to more than one shared location (e.g. the attachment is uploaded to each recipient's configured shared location).

Flowing to operation 650, permissions for accessing the uploaded attachments are set such that each recipient is able to access the uploaded attachment. According to an embodiment, the attachment is set to read/write permission for each recipient of the message. A user may change these permissions by accessing a change option within the electronic message and/or by accessing the shared location where the attachment is uploaded.

Moving to operation 660, the attachments within the message are replaced with links that may be used to access each of the uploaded attachments.

Transitioning to operation 670, the electronic message is sent to the recipients.

The process then flows to an end block and returns to processing other actions.

FIG. 7 shows a process for automatically downloading content that is associated with a received message that includes a link to an uploaded attachment.

After a start block, process 700 moves to operation 710, where the electronic message is received. The electronic message may be any electronic message that includes a link to an attachment that was uploaded to a shared location. According to an embodiment, the electronic messages are email messages. Other messages may also include links, such as SMS, MMS, Instant Messages, social network messages, and the like. The message may be received by a client based application and/or a Web based application.

Flowing to operation 720, any links to uploaded attachments within the electronic message are detected. A link may be associated with an uploaded attachment using different methods. For example, the link itself may contain information that indicates the content that the link addresses was uploaded due to a size limitation. According to an embodiment, the links are detected before the received message is viewed.

Moving to operation 730, the attachment may be automatically downloaded. According to an embodiment, the content is automatically downloaded and displayed within the attachment area of the electronic message before the user receiving the message views the message.

Transitioning to operation 740, the links to the content that is automatically downloaded are replaced with an attachment of the content.

Flowing to operation 750, the electronic message is displayed with the attachment with the electronic message. When a user views the message, the attachment may be opened.

The process then flows to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:
   detecting that an attachment is attached to an electronic message that is addressed to a recipient before receiving a request to send the electronic message;
   determining a size of the attachment;
   determining when the size exceeds a predetermined threshold and when the size exceeds the predetermined threshold:
   determining a shared location to upload the attachment based on a type of the attachment and setting the shared location to a particular shared location based on whether or not the type of the attachment is a picture;
   uploading the attachment to the shared location;
   setting permissions for the attachment at the shared location such that the recipient is able to access the attachment;
   removing the attachment from the electronic message; and
   inserting a link to the attachment at the shared location; and
   sending the electronic message in response to receiving the request to send the electronic message.

2. The method of claim 1, wherein determining the shared location to upload the attachment based on the type of the attachment comprises setting the shared location to a particular shared location based on whether or not the type of the attachment is a word processing document.

3. The method of claim 1, wherein determining the shared location to upload the attachment based on the type of the attachment comprises setting the shared location to a particular shared location based on whether or not the type of the attachment is a video.

4. The method of claim 1, wherein determining the shared location to upload the attachment based on the type of the attachment comprises setting the shared location to at least one of: a first shared location when the type of the attachment is a picture; and a second shared location when the type of the attachment is a word processing document.

5. The method of claim 1, wherein the predetermined size threshold is based on a size restriction of a message gateway.

6. The method of claim 1, further comprising displaying a graphical menu within the electronic message that comprises an option for sending a link to the attachment in place of the attachment and an option for managing permissions of the attachment.

7. A computer-readable storage device having memory storing computer-executable instructions that, upon execution, perform a method for uploading an attachment to a shared location and replacing the attachment with a link, the method further comprising:
   detecting that the attachment is attached to an electronic message that is addressed to a recipient;
   determining a size of the attachment;
   determining when the size exceeds a predetermined threshold and when the size exceeds the predetermined threshold:
   determining the shared location to upload the attachment based on a type of the attachment and setting the shared location to a particular shared location based on whether or not the type of the attachment is a picture;
   uploading the attachment to the shared location that is associated with an online service before sending the electronic message;
   automatically setting permissions for the attachment at the shared location such that the recipient is able to access the attachment;
   removing the attachment from the electronic message;
   inserting the link to the attachment at the shared location; and
   sending the electronic message.

8. The computer-readable storage device of claim 7, wherein determining the shared location to upload the attachment based on the type of the attachment comprises setting the shared location to a particular shared location based on whether or not the type of the attachment is a word processing document.

9. The computer-readable storage device of claim 7, wherein determining the shared location to upload the attachment based on the type of the attachment comprises setting the shared location to a particular shared location based on whether or not the type of the attachment is a video.

10. The computer-readable storage device of claim 7, wherein determining the shared location to upload the attachment based on the type of the attachment comprises setting the shared location to at least one of: a first shared location when the type of the attachment is a picture; and a second shared location when the type of the attachment is a word processing document.

11. The computer-readable storage device of claim 7, wherein the predetermined size threshold is based on a size restriction of a message gateway.

12. The computer-readable storage device of claim 7, further comprising displaying a graphical menu within the electronic message that comprises an option for sending a link to the attachment in place of the attachment and an option for managing permissions of the attachment.

13. The computer-readable storage device of claim 7, wherein setting the permissions for the attachment at the shared location such that the recipient is able to access the attachment comprises determining each recipient of the message and setting a default set of permissions for each of the recipients.

14. A system comprising:
   a processor, memory, and a computer-readable storage memory;
   an operating environment stored on the computer-readable storage memory and executing on the processor;
   a messaging application; and
   an attachment manager operating in conjunction with the messaging application that performs a method for uploading an attachment to a shared location and replacing the attachment with a link, the method further comprising:

detecting that an attachment is attached to an electronic message that is addressed to a recipient;

determining a size of the attachment;

determining when the size exceeds a predetermined threshold and when the size exceeds the predetermined threshold:

determining a shared location to upload the attachment based on a type of attachment and setting the shared location to a particular shared location based on whether or not the type of the attachment is a picture;

uploading the attachment to the shared location that is associated with an online service before sending the electronic message;

automatically setting permissions for the attachment at the shared location such that the recipient is able to access the attachment;

removing the attachment from the electronic message; and inserting a link to the attachment at the shared location.

15. The system of claim 14, wherein determining the shared location to upload the attachment based on the type of the attachment comprises setting the shared location to a particular shared location based on whether or not the type of the attachment is a word processing document.

16. The system of claim 14, wherein determining the shared location to upload the attachment based on the type of the attachment comprises setting the shared location to a particular shared location based on whether or not the type of the attachment is a video.

17. The system of claim 14, wherein determining the shared location to upload the attachment based on the type of the attachment comprises setting the shared location to at least one of: a first shared location when the type of the attachment is a picture; and a second shared location when the type of the attachment is a word processing document.

* * * * *